United States Patent [19]

Lanham

[11] Patent Number: 5,127,289

[45] Date of Patent: Jul. 7, 1992

[54] WRENCH FOR HEXAGONAL REGULAR NUTS AND LOCKNUTS

[75] Inventor: Thomas R. Lanham, Eggertsville, N.Y.

[73] Assignee: McGard, Inc., Orchard Park, N.Y.

[21] Appl. No.: 749,986

[22] Filed: Aug. 26, 1991

Related U.S. Application Data

[63] Continuation-in-part of Ser. No. 656,698, Feb. 19, 1991, abandoned.

[51] Int. Cl.⁵ .............................................. B25B 13/00
[52] U.S. Cl. ..................... 81/124.4; 81/124.5; 81/437
[58] Field of Search ............... 81/121.1, 124.4, 124.5, 81/436, 437

[56] References Cited

U.S. PATENT DOCUMENTS

| | | | |
|---|---|---|---|
| 1,619,255 | 3/1927 | Haynes | 81/124.5 X |
| 1,898,726 | 2/1933 | Hess . | |
| 2,372,269 | 3/1945 | Golan | 81/121.1 |
| 2,613,565 | 10/1952 | Saunders | 81/53 |
| 2,613,942 | 10/1952 | Saunders | 279/72 |
| 3,241,408 | 3/1966 | McCauley | 81/436 |
| 3,396,765 | 8/1968 | Ridenour | 81/437 |
| 3,779,105 | 12/1973 | Triplett et al. | 81/121 R |
| 4,724,730 | 2/1988 | Mader et al. | 81/53.2 |

Primary Examiner—James G. Smith
Attorney, Agent, or Firm—Joseph P. Gastel

[57] ABSTRACT

A wrench for selectively turning a either conventional polygonal nut or a locknut having a key-receiving configuration onto a threaded stud including a wrench body, a polygonal bore in the wrench body, a rectilinearly slidable bit in the bore and biased to an outwardly extending position by a spring, a nose on the bit for mating engagement with the key-receiving configuration of the locknut, a first shoulder within a counterbore of the wrench body for engaging an end of the locknut, the bit being retractable against the bias of the spring when the polygonal nut is inserted into the polygonal bore for mating engagement therewith, and a second shoulder on the wrench body for engaging a shoulder on the polygonal nut.

26 Claims, 5 Drawing Sheets

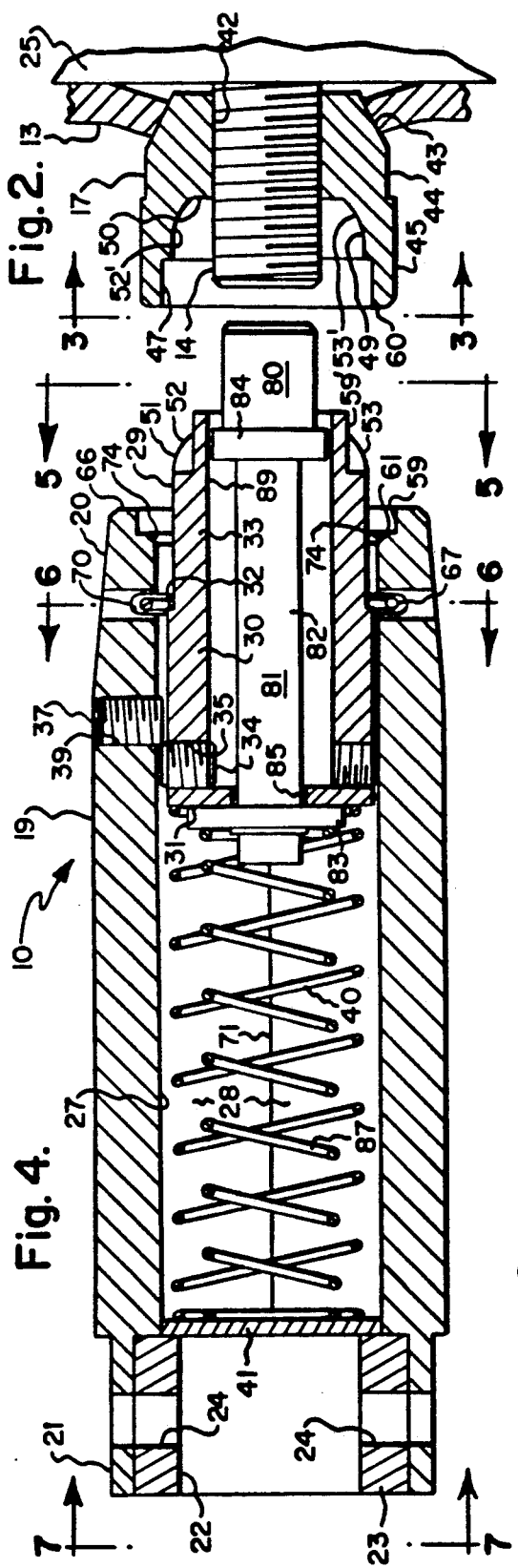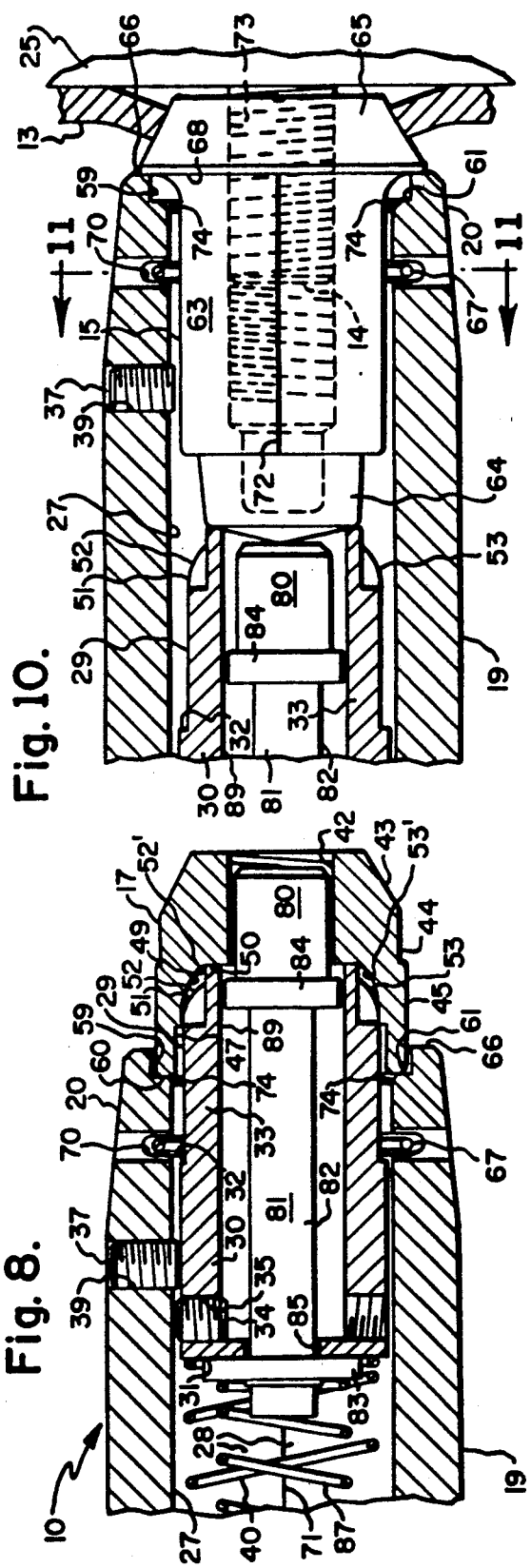

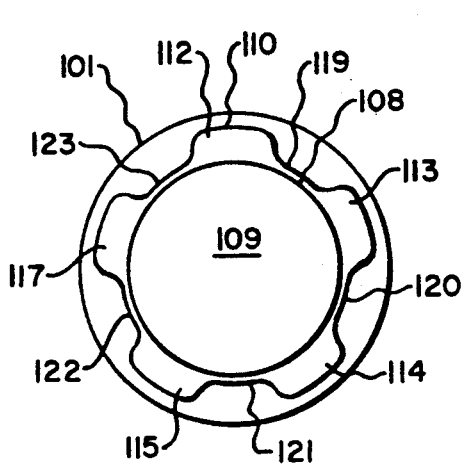
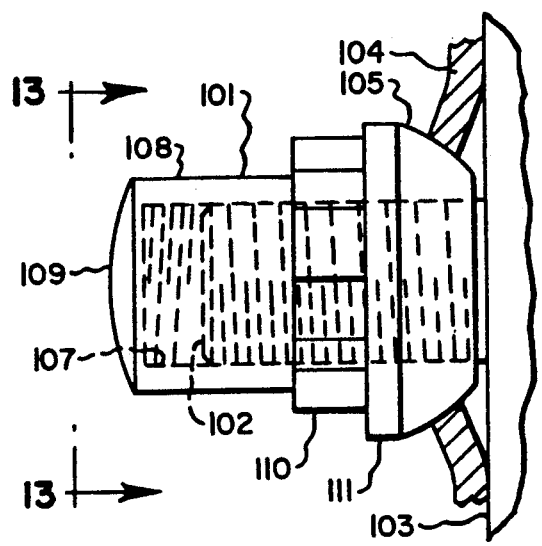
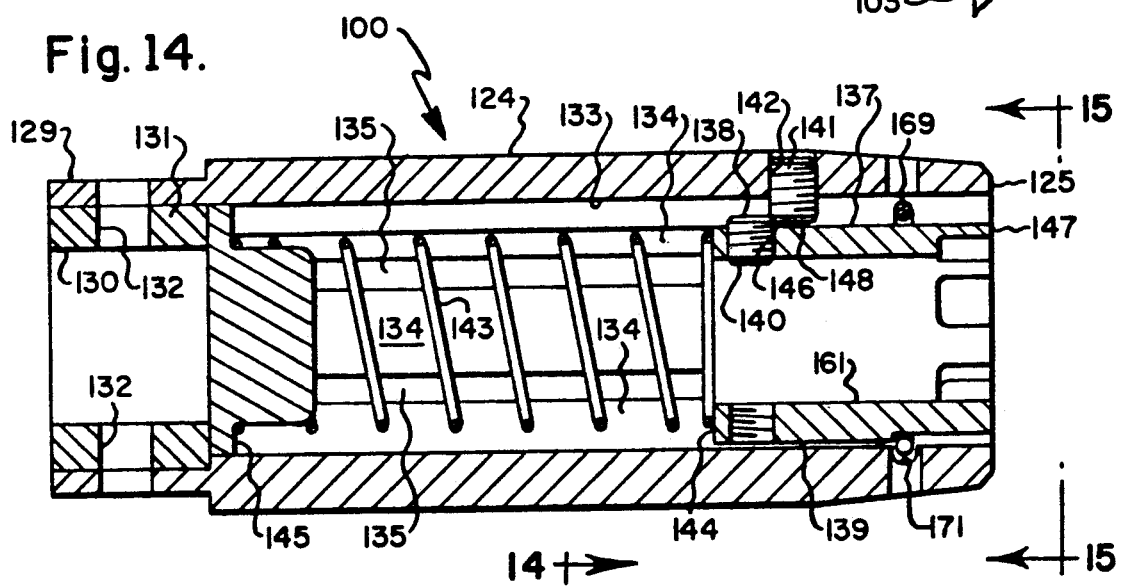
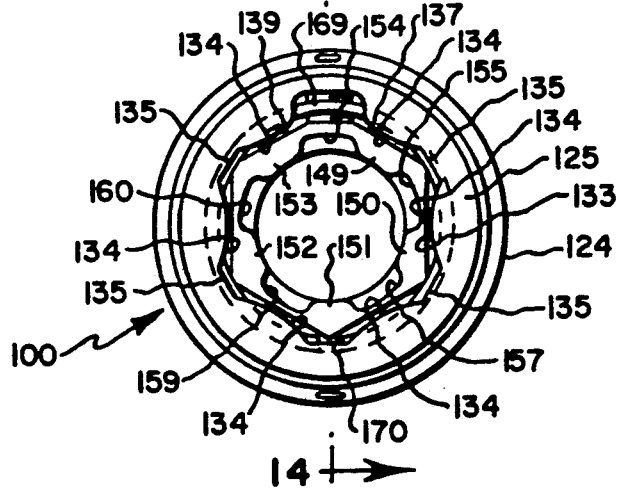

WRENCH FOR HEXAGONAL REGULAR NUTS AND LOCKNUTS

CROSS REFERENCE TO RELATED APPLICATION

The present application is a continuation-in-part of application Ser. No. 656,698, filed Feb. 19, 1991, now abandoned.

BACKGROUND OF THE INVENTION

The present invention relates to a wrench for automatically selectively turning conventional polygonal nuts and locknuts.

By way of background, in the automotive industry, wheel rims are mounted on axle studs by means of a plurality of nuts. In certain automobiles, where the rims and tires are very valuable, a plurality of conventional polygonal nuts and one locknut are used to secure the rim to the axle studs. The polygonal nuts can be removed by any conventional wrench. The locknut can only be removed by a specialized key-type of wrench because a conventional wrench cannot grip it. The foregoing arrangement guards against unauthorized removal of the wheel rim from its associated studs.

In the past, insofar as known, the polygonal nuts were installed by means of a first wrench mounted on a pneumatic gun and the cylindrical locknuts were installed by a second wrench. This procedure required more handling and effort than if a single wrench could perform both tasks.

SUMMARY OF THE INVENTION

It is the object of the present invention to provide a wrench construction which is capable of selectively either turning a regular polygonal nut or a locknut, thereby facilitating the installation of a plurality of such different nuts onto a wheel rim with the attendant saving of time and effort. Other objects and attendant advantages of the present invention will readily be perceived hereafter.

The present invention relates to a wrench for selectively turning either a first nut which is polygonal or a second nut which has a key-receiving configuration thereon comprising a wrench body having an open end, a bore in said wrench body, a member for turning said second nut, means mounting said member in keyed relationship with said wrench body and for axial sliding movement in said bore, spring means in said wrench body for biasing said member toward said open end, key means on said member for mating with said key-receiving configuration of said second nut for establishing a turning relationship therewith, and bore means proximate said open end for receiving said first nut in turning relationship when said polygonal nut displaces said member into said wrench body against the bias of said spring means.

The various aspects of the present invention will be more fully understood when the following portions of the specification are read in conjunction with the accompanying drawings wherein:

BRIEF DESCRIPTION OF THE DRAWINGS

FIG. 2 is an enlarged fragmentary cross sectional view of the locknut mounted on an associated stud and taken substantially along line 2—2 of FIG. 1;

FIG. 4 is a cross sectional view taken substantially along line 4—4 of FIG. 5 and showing the wrench of the present invention for driving either a conventional polygonal nut or a locknut;

FIG. 8 is a fragmentary cross sectional view similar to FIG. 4 but showing a locknut mounted on the wrench;

FIG. 10 is a view similar to FIG. 8 but showing a conventional polygonal nut mounted on the wrench tool;

FIG. 12 is a fragmentary side elevational view, partially in cross section, showing another type of locknut in position on a wheel rim;

FIG. 13 is an end elevational view of the locknut of FIG. 12 taken substantially in the direction of arrows 13—13 of FIG. 12;

FIG. 14 is a cross sectional view taken substantially along line 14—14 of FIG. 15 and showing a wrench which is capable of driving either a conventional polygonal nut or the locknut of FIG. 12;

FIG. 15 is an end elevational view of the wrench taken substantially in the direction of arrows 15—15 of FIG. 14;

DESCRIPTION OF THE PREFERRED EMBODIMENT

Figure 1:
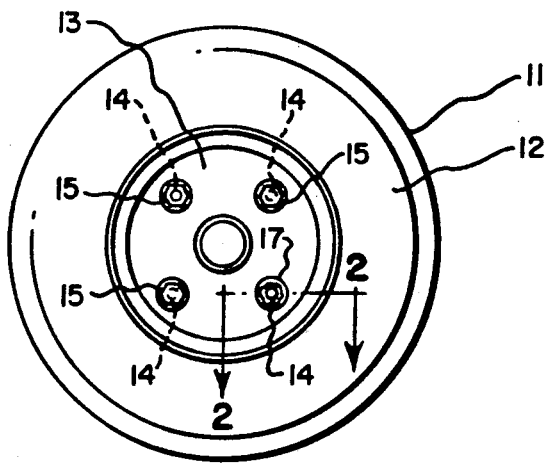
FIG. 1 is a side elevational view of an automotive wheel wherein the rim is mounted by a plurality of conventional polygonal nuts and a cylindrical locknut which can be installed and removed from an associated stud only with a specialized key.
Figure 3:
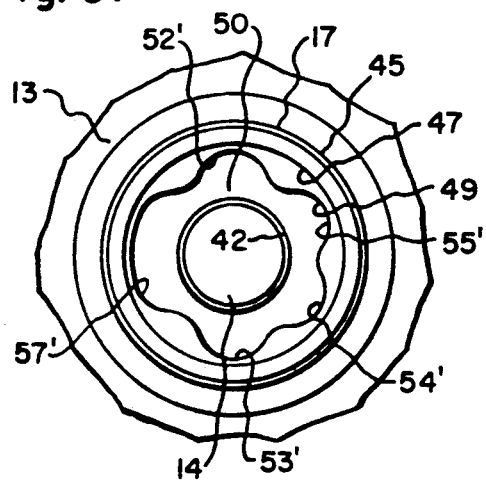
FIG. 3 is a fragmentary view taken substantially in the direction of arrows 3—3 of FIG. 2 and showing the face of the locknut.
Figure 5:
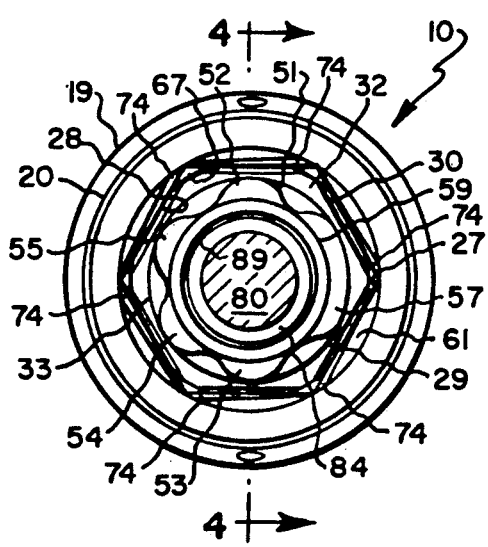
FIG. 5 is an end elevational view, partially in cross section, taken substantially in the direction of arrows 5—5 of FIG. 4.

Summarizing briefly in advance, the wrench 10 (FIG. 4) of the present invention is adapted to be mounted on a pneumatic gun (not shown) which is used for tightening nuts onto the studs on which an automotive wheel rim is mounted. The wrench 10 is capable of tightening both conventional nuts and locknuts. In this respect, an automotive wheel 11 which includes a tire 12 mounted"

on rim 13 is mounted on studs 14 by a plurality of conventional polygonal nuts 15 and a locknut 17. The locknut 17 prevents unauthorized removal of the wheel from the studs on which it is mounted because it requires a special key to unscrew it.

The wrench 10 is for the purpose of installing both conventional nuts 15 and a locknut 17 onto the studs 14 so that two different wrenches are not required for this purpose. Accordingly, assembly of the wheels onto cars in the automobile factory is facilitated by decreasing both the effort and time required for this task.

The wrench 10 includes a hollow metal wrench body 19 having a front end 20, for turning either locknut 17 or conventional nut 15, and a rear end 21 having a square opening 22 in a block 23 which is press-fitted into body 19. Square bore 22 is for the purpose of receiving a mating driving member of a pneumatic gun. Bores 24 receive ball detents on the driving member for holding wrench body 19 therein.

As noted above, wrench 10 can selectively drive conventional polygonal nuts 15 or a cylindrical locknut 17 onto studs 14 which extend outwardly from plate 25 attached to the automotive axle. Body 19 has a hexagonal bore 27 therein having sides 28. A locknut driving bit 29 has a hexagonal rear portion 30 of a size for free rectilinear sliding movement in hexagonal bore 27. The hexagonal portion 30 extends between bit end 31 and shoulder 32 at the junction of hexagonal portion 30 and a cylindrical portion 33. A set screw 34 is threaded into a bore 35 in bit 29. Another set screw 37 is threaded into a bore 39 in body 19. A light spring 40 has one end bearing on the end 31 of bit 29 and its opposite end bearing on plate 41 which bears against block 23 to thereby bias bit 29 to the position shown in FIG. 4. In this respect it is to be noted that there is a clearance between the end of set screw 34 and the hexagonal bore 27, and there is also a clearance between the end of set screw 37 and the outer hexagonal surface of bit 29. The only purpose for set screws 34 and 37 is so that they engage each other as shown in FIG. 4 to prevent spring 40 from ejecting bit 29 from wrench body 19. A keyway of very small depth (not shown) is located in the side 28 of hexagonal bore 27 in opposition to the top of set screw 34 to further insure clearance between the top of set screw 34 and the side 28 of bore 27 so that there will be no binding therebetween as the bit 29 moves in the bore. Set screws 34 and 37 will in no way impede free movement of bit 29 within hexagonal bore 27 between plate 41 and set screw 37 because of the clearances stated above.

Bit 29 is for the purpose of driving locknut 17 onto stud 14. In this respect locknut 17 includes an internally threaded portion 42 which threads onto stud 14. It also includes a frustoconical nose portion 43 proximate a first cylindrical portion 44 which is located proximate a second cylindrical annular portion 45. A cylindrical inner surface 47 is located at the end of locknut 17, and an internal irregular grooved surface 49 is located between internal cylindrical surface 47 and shoulder 50. The nose 51 of bit 29 has an irregular series of lobes 52, 53, 54, 55 and 57 for mating into groove portions 52', 53', 54', 55' and 57', respectively, of groove 49. The nose 51 terminates at a small cylindrical lip 59.

Figure 9:
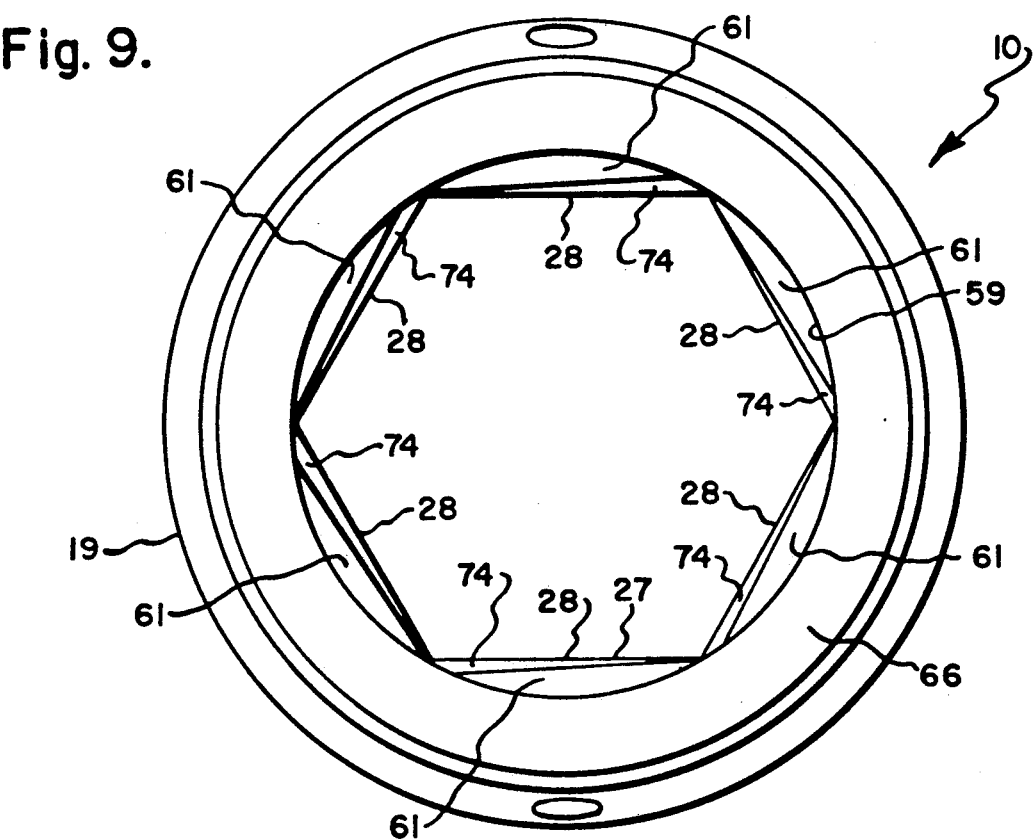
FIG. 9 is an enlarged view taken substantially in the direction of the arrows 5—5 of FIG. 4 of the wrench body with the bit removed and showing the camming surfaces for orienting a hexagonal nut into alignment with the hexagonal bore in the wrench body.

The manner in which locknut 17 fits into the nose portion 20 of body 19 is shown in FIG. 8. In this respect, the outer surface of cylindrical end 45 fits into counterbore 59 and the annular end 60 of locknut 17 bears against segments 61 (FIG. 9) at the end of counterbore 59. Segments 61 are defined by the intersections of the sides of hexagonal bore 27 and counterbore 59. At this time bit 29 will be forced to the partially retracted position of FIG. 8 from the position of FIG. 4. The size relationship between cylindrical portion 45 of the locknut and the internal diameter of counterbore 59 is such that the locknut will be loosely retained in position within the counterbore while it is also supported on tip 80 of slidable plunger 81 which fits into tapped bore 42 of nut 17 while the wrench 10 approaches the stud 14. It will be appreciated that locknut 17 will be rotated when body 19 is rotated by the pneumatic gun because of the hexagonal fit between rear portion 30 of bit 29 and hexagonal bore 27. If the lobes 52, 53 etc. of the bit are not aligned with groove portions 52', 53', etc., the frictional fit between the bit and the locknut will turn the latter initially to screw it onto stud 14. This frictional fit is primarily between the shoulder provided by segments 61 and the annular end 60 of locknut 17. Also there may be frictional engagement between the outer surface of nut 17 and the cylindrical side of counterbore 59. When the locknut encounters sufficient resistance against turning, the bit 29 will turn relative thereto and the lobes will move into the grooves of the locknut to provide a keyed relationship therewith to complete the tightening of the locknut onto the stud.

Plunger 81 includes a central portion 82 and an enlarged collar 83 on the end thereof. An enlarged collar 84 is located at the junction of tip 80 and central portion 82. Also, an aperture 85 is located at the end of bit 29. A spring 87 has one end bearing on plate 41 and the opposite end bearing on collar 83. Thus, as locknut 17 is threaded onto stud 14 and the latter enters internally threaded bore 42 of nut 14, the plunger 81 will be retracted to the left in FIG. 8 against the bias of spring 87. During the axial movement of plunger 81 in bit 29, there is a sliding relationship between collar 84 and the inner surface 89 of the bit 29, and there is also a sliding relationship between the central pin portion 82 and the border of aperture 85. These two sliding relationships guide plunger 81 for rectilinear movement. In this manner, locknut 17 is driven onto one of the studs 14. It is to be noted that when bit 29 is caused to move from the position of FIG. 4 to the position of FIG. 8, it will do so against the bias of springs 40 and 87.

Figure 6:
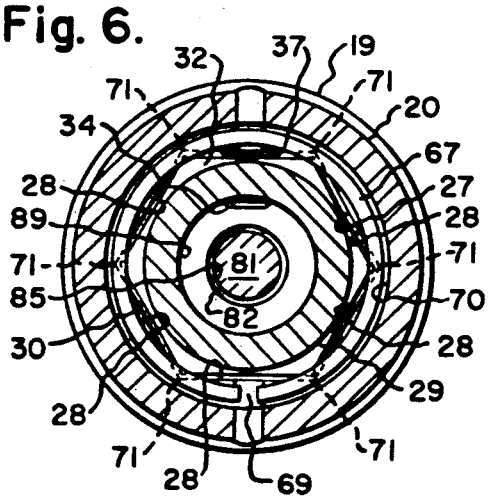
FIG. 6 is a cross sectional view taken substantially along line 6—6 of FIG. 4 and showing the spring construction for releasably holding a polygonal nut.
Figure 7:
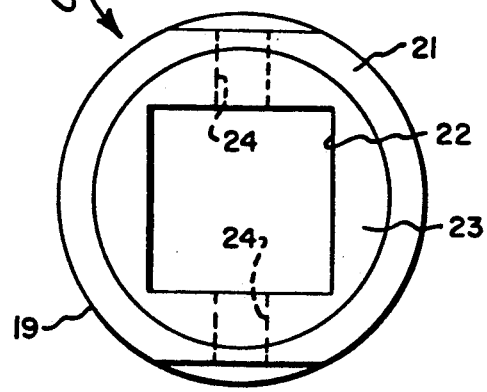
FIG. 7 is an end elevational view taken substantially in the direction of arrows 7—7 of FIG. 4 and showing the end of the wrench tool which receives a driving member from a pneumatic gun.
Figure 11:
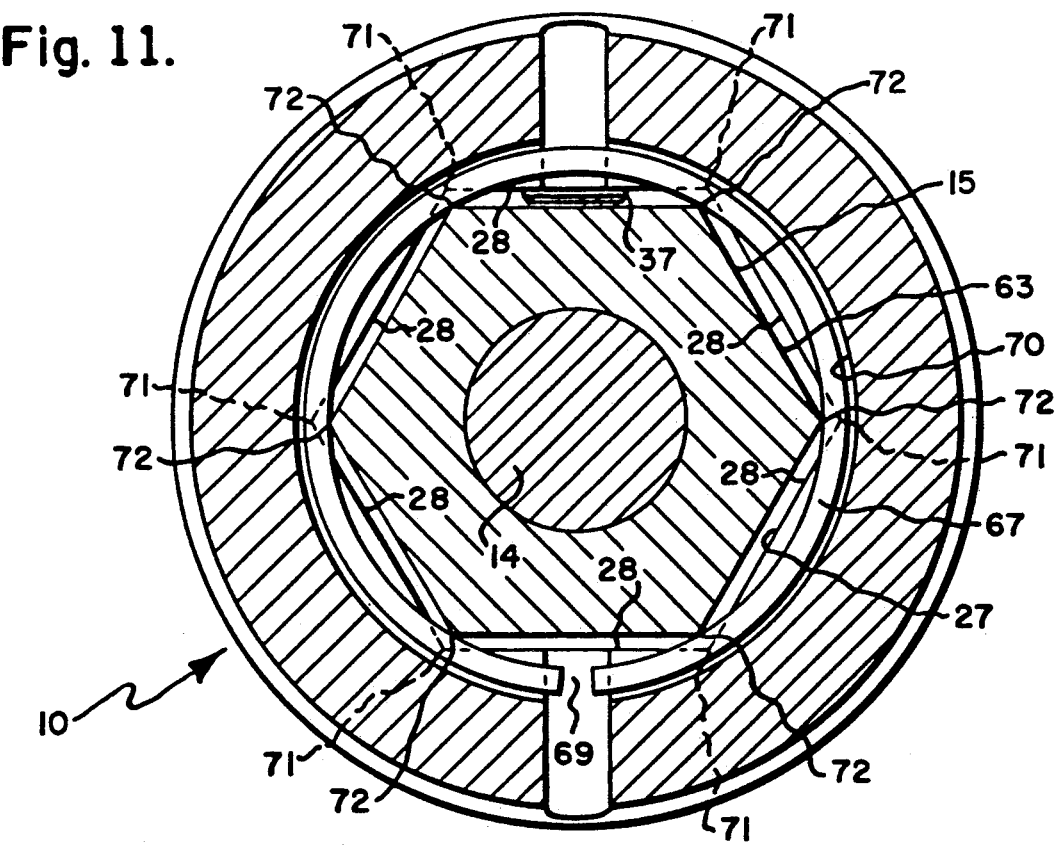
FIG. 11 is a cross sectional view taken substantially along line 11—11 of FIG. 10 and showing how a spring in the wrench body retains a polygonal nut therein.

As noted above, the wrench 10 is also selectively capable of threading a conventional polygonal type of nut 15 onto a stud 14. In this respect, this particular conventional nut 15 includes a hexagonal body portion 63 having a frustoconical end 64 and a frustoconical nose 65 which terminates at shoulder 68 at the junction between the nose and the hexagonal portion 63. A split ring type of spring 67 has a continuous periphery and is split at 69 (FIGS. 6 and 11). Spring 67 is positioned in annular groove 70 in wrench body 19. The normal internal diameter of spring 67 is smaller than the distance between opposed vertices such as 71 of hexagonal bore 27. The vertices 71 are located at the intersection of sides 28 of the bore (FIG. 6). Furthermore, the internal diameter of spring 67 is smaller than the distance across the diametrically opposite vertices 72 of hexagonal nut portion 63. Therefore, when the nut 15 is inserted into hexagonal bore 27, the vertices 72 (FIG. 10) of hexagonal nut portion 63 will bear against the adjacent portions of split spring 67 which protrude inwardly beyond hexagonal bore vertices 71, and thus ring spring 67 will exert a biasing force on hexagonal nut body portion 63 to retain it within the nose 20 of wrench body 19. Thus the frustoconical end portion of nut 15 can be placed onto a stud 14 so that the internally threaded portion 73 thereof can be threaded onto stud 14. When the hexagonal nut 15 is located in hexagonal bore 27, there will be a driving relationship established therebetween. After nut 15 has reached its final tightened position on rim 13, wrench 10 can be withdrawn and spring 67 will return to its unstressed condition and move the bit 29 to the position of FIG. 4. When nut 15 is in the position of FIG. 10, shoulder 68 thereof will bear against annular end 66 of nose 20.

The extreme edge of each side 28 of hexagonal bore 27 at nose end 20 is chamfered to produce inclines 74 (FIG. 9) which are camming surfaces which will tend to rotate the hexagonal nut 17 into aligned position within hexagonal bore 27 in the event the vertices of the nut are not aligned with the vertices of the hexagonal bore when the nut is first inserted into the nose end 20. In this respect, if the vertices are not aligned, the inclined chamfered surfaces will produce a camming action on the vertices of the nut to rotate its hexagonal portion into alignment with the hexagonal bore.

It is to be noted that when nut 15 is held within wrench 10, as shown in FIG. 10, bit 29 and plunger 81 are both in retracted positions against the bias of springs 40 and 87, and when the nut 15 has been removed from its position of FIG. 10, the bit 29 and plunger 81 will be returned to the positions of FIG. 4 under the bias of springs 40 and 87.

While the locknut 17 has been shown as having a surface of revolution which is cylindrical, it will be appreciated that by suitably modifying the opening in end 20 of wrench body 19, locknuts having a frustoconical outer surface can also be turned by wrench 10, especially considering the supporting capability of plunger 81.

The wrench 100 of FIGS. 14–18 is a modified form of the present invention which is also adapted to be mounted on a pneumatic gun (not shown) which is used for tightening nuts onto the studs on which an automotive wheel rim is mounted. The wrench 100 is capable of tightening both conventional nuts and locknuts 101 (FIGS. 12 and 13) of a different type than locknuts 17 described above, one of which is shown in position on the end of stud 102 extending outwardly from plate 103 on the automotive axle. Locknut 101 includes a curved nose 105 which bears against wheel rim 104. It also includes a tapped bore 107 which receives stud 102 in threaded relationship. The end remote from nose 105 includes a cylindrical body portion 108 and a curved end 109. A key-receiving configuration 110 is located between rim 111 of curved nose 105 and cylindrical body portion 108. The key-receiving portion 110 includes a plurality of lobes 112, 113, 114, 115 and 117 with grooves 119, 120, 121, 122 and 123 therebetween. The lobes and grooves may be spaced in any desired relationship for receiving a mating key, not shown.

The wrench 100 includes a hollow metal wrench body 124 having a front end 125, for turning either locknut 101 or conventional hexagonal nut 127 (FIG. 17), and a rear end 129 having a square opening 130 in a block 131 which is press-fitted into body 124. Square bore 130 is for the purpose of receiving a mating driving member of a pneumatic gun. Bores 132 receive ball detents on the driving member for holding wrench body 124 thereon.

Body 124 has a generally hexagonal bore 133 therein having curved sides 134 therein with side portions 135 therebetween. A locknut driving bit 137 has a hexagonal outer surface portion 139 of a size for free rectilinear sliding movement in bore 133. A set screw 140 is threaded into a bore 146 in bit 137. Another set screw 141 is threaded into a bore 142 in body 124. A spring 143 has one end bearing on the end 144 of bit 137 and its opposite end bearing on plate 145 which bears against block 131 to thereby bias bit 137 to the position shown in FIG. 14. In this respect it is to be noted that there is a clearance between the outer end 138 of set screw 140 and the hexagonal bore 133, and there is also a clearance between the end 148 of set screw 141 and the outer hexagonal surface 139 of bit 137. The only purpose for set screws 140 and 141 is so that they engage each other as shown in FIG. 14 to prevent spring 143 from ejecting bit 137 from wrench body 124. One of the straight sides 135 of the bore is spaced from the outer end 138 of set screw 140 to insure a clearance therebetween. Set screws 140 and 141 will in no way impede free movement of bit 137 within hexagonal bore 133 because of the clearances stated above.

Bit 137 is for the purpose of driving locknut 101 onto stud 102. In this respect, the nose 147 of bit 137 has a series of lobes 149, 150, 151, 152 and 153 (FIG. 15) for mating into groove portions 119, 120, 121, 122 and 123, respectively, of nut portion 110, and it has grooves 154, 155, 157, 159 and 160 for receiving lobes 112, 113, 114, 115 and 117 of nut portion 110.

Figure 16:
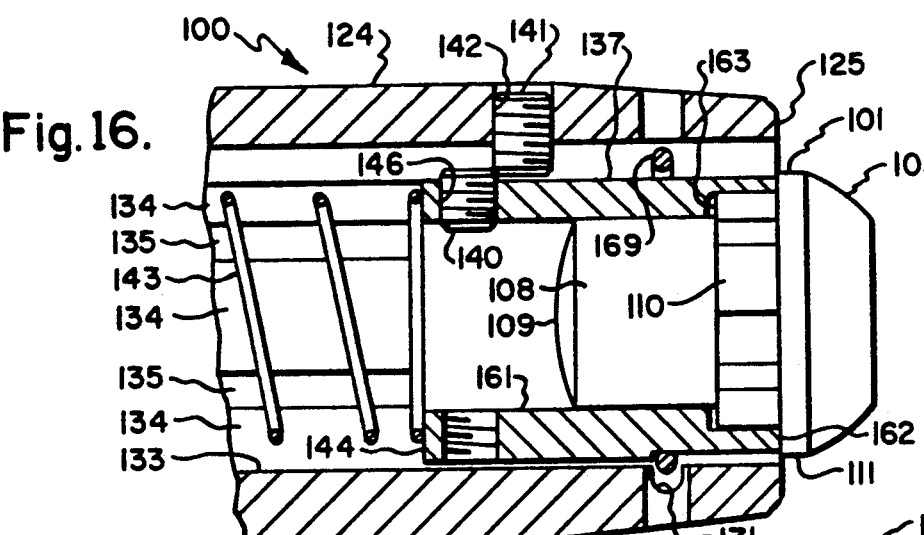
FIG. 16 is a fragmentary enlarged cross sectional view of the end of the wrench mounting the locknut of FIG. 12 in driving relationship.
Figure 17:
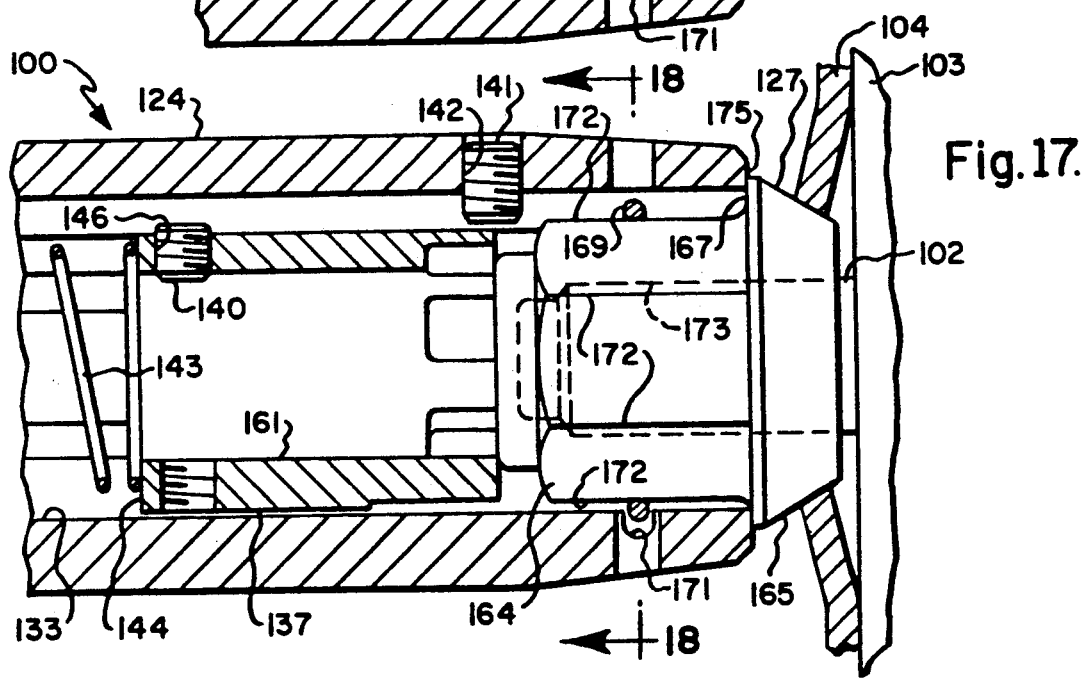
FIG. 17 is an enlarged fragmentary view of the wrench mounting a conventional hexagonal nut in driving relationship.

The manner in which locknut 101 fits into the bit 137 is shown in FIG. 16. In this respect, the outer cylindrical surface 108 fits into bore 161 with a suitable clearance therebetween. In addition the lobes and grooves of each of the bit and locknut are shown in mating relationship in FIG. 16 without numerals thereon in the interest of clarity. It will be appreciated, however, that originally the lobes and grooves of the bit may not be in alignment with the grooves and lobes, respectively, of the locknut. However, the frictional engagement between cylindrical surface 108 and bore 161 and the contact between the ends such as 162 (FIG. 16) of the lobes on the bit 137 with the ends such as 163 of the lobes of the locknut will cause the bit to rotate the locknut onto the stud 102. A point will be reached, however, where the bit 137 will rotate relative to locknut 101 and the two parts will engage in interlocking relationship, as shown in FIG. 16, so that the wrench 100 will tighten locknut 101 to its proper tightness. During the tightening operation, bit 137 may be moved to the left in FIG. 16 against the bias of spring 143. It will be appreciated that locknut 101 will be rotated when body 124 is rotated by the pneumatic gun because of the hexagonal fit between outer portion 139 of bit 137 and the generally hexagonal bore 133.

Figure 18:
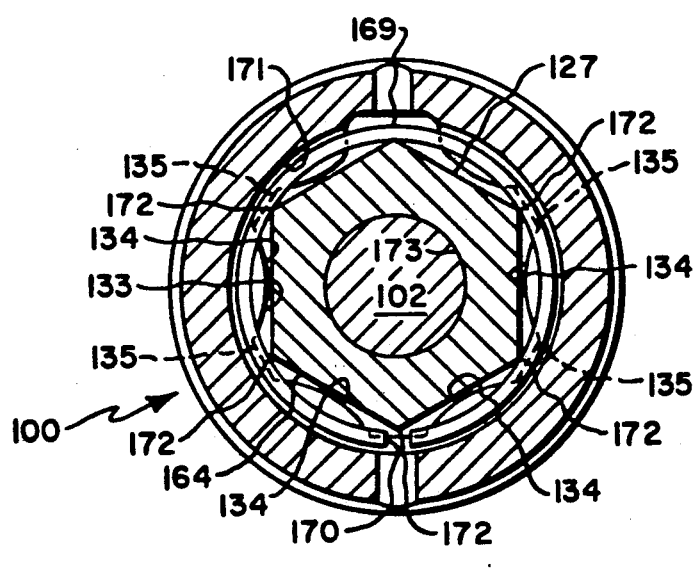
FIG. 18 is a cross sectional view taken substantially along line 18—18 of FIG. 17 and showing the conventional nut held within the wrench by a spring.

As noted above, the wrench 100 is also selectively capable of threading a conventional polygonal type of nut 127 onto a stud 102. In this respect, this particular conventional nut 127 includes a hexagonal body portion 164 having a frustoconical nose 165 which terminates at shoulder 167 at the junction between the nose 165 and the hexagonal portion 164. A split ring type of spring 169 has a continuous periphery and is split at 170 (FIGS. 15 and 18). Spring 169 is positioned in annular groove 171 in wrench body 124. The normal internal diameter of spring 169 is smaller than the distance across opposed side portions 135 of hexagonal bore 133 (FIG. 15). Furthermore, the internal diameter of spring 169 is smaller than the diameter of a circle defined vertices 172 of hexagonal nut portion 164. Therefore, when the nut 127 is inserted into hexagonal bore 133, the vertices 172 (FIG. 18) of hexagonal nut portion 164 will bear against the adjacent portions of split spring 169 which protrude inwardly beyond side portions 135 of the hexagonal bore 133, and thus ring spring 169 will exert a biasing force on hexagonal nut body portion 164 to retain it within the nose of wrench body 124. Thus the frustoconical end portion of nut 127 can be placed onto a stud 102 so that the internally threaded portion 173 thereof can be threaded onto stud 102. When the hexagonal nut 127 is located in hexagonal bore 133, there will be a driving relationship established therebetween. Also when nut 127 is in the position of FIG. 17, shoulder 167 thereof will bear against annular end 175 of the nose. After nut 127 has reached its final tightened position on stud 102, wrench 100 can be withdrawn and spring 143 will return to its unstressed condition and move the bit 137 to the position of FIG. 14.

In order to enhance the seating of locknut 101 into its fully seated position of FIG. 16 within bit 137, the ends of the lobes of the bit can be chamfered in the manner discussed above relative to FIG. 9 so as to produce a camming action between the ends of the lobes on bit 137 and the ends of the lobes 112, 113, 114 etc. to promote the relative rotation therebetween resulting in the fully seated orientation of FIG. 16.

While preferred embodiments of the present invention has been disclosed, it will be appreciated that it is not limited thereto but may be otherwise embodied within the scope of the following claims.

What is claimed is:

1. A wrench for selectively turning either a first nut which is polygonal or a second nut which has a key-receiving configuration thereon comprising a wrench body having an open end, a bore in said wrench body, a member for turning said second nut, means mounting said member in keyed relationship with said wrench body and for axial sliding movement in said bore, spring means in said wrench body for biasing said member toward said open end, key means on said member for mating with said key-receiving configuration of said second nut for establishing a turning relationship therewith, bore means proximate said open end for receiving said first nut in turning relationship when said polygonal nut displaces said member into said wrench body against the bias of said spring means, and abutment means proximate said open end for engaging said first nut for causing said wrench body to exert an axial force thereon.

2. A wrench as set forth in claim 1 including second abutment means proximate said open end for exerting an axial force on said second nut.

3. A wrench as set forth in claim 2 wherein said second abutment means comprises a shoulder within a counterbore within said open end.

4. A wrench as set forth in claim 3 wherein said counterbore is only slightly larger than the diameter of said second nut so as to establish a loose fit therewith.

5. A wrench as set forth in claim 3 wherein said first abutment means comprises a surface on said wrench body located radially outwardly from said shoulder.

6. A wrench as set forth in claim 2 wherein said abutment means comprises an end surface on said wrench body, and wherein said second abutment means comprises a shoulder within said wrench body.

7. A wrench as set forth in claim 6 including retaining means for releasably retaining said fist nut within said polygonal bore.

8. A wrench as set forth in claim 7 wherein said retaining means comprises a yieldable spring.

9. A wrench as set forth in claim 8 wherein said yieldable spring comprises a split-ring type of spring, and a groove in said wrench body for housing said split-ring type of spring in position.

10. A wrench as set forth in claim 2 wherein said second abutment means comprises a surface on said member for turning said second nut.

11. A wrench for selectively turning either a first nut which is polygonal or a second nut which has a key-receiving configuration thereon comprising a wrench body having an open end, a bore in said wrench body, a member for turning said second nut, means mounting said member in keyed relationship with said wrench body and for axial sliding movement in said bore, spring means in said wrench body for biasing said member toward said open end, key means on said member for mating with said key-receiving configuration of said second nut for establishing a turning relationship therewith, bore means proximate said open end for receiving said first nut in turning relationship when said polygonal nut displaces said member into said wrench body against the bias of said spring means, and retaining means for releasably retaining said first nut within said bore means.

12. A wrench as set forth in claim 11 wherein said retaining means comprises yieldable spring means for engaging the circumference of said first nut.

13. A wrench as set forth in claim 11 wherein said bore is polygonal and wherein said member is of a polygonal shape to fit in said polygonal bore.

14. A wrench as set forth in claim 11 wherein said key-receiving configuration of said second nut comprises a first series of lobes and grooves on the outer surface thereof, and wherein said key means comprises a second series of lobes and grooves on the inside of said member.

15. A wrench as set forth in claim 11 wherein said key-receiving configuration of said second nut comprises a first series of lobes and grooves on an inner surface thereof, and wherein said key means comprises a second series of lobes and grooves on the outside of said member.

16. A wrench as set forth in claim 12 wherein said yieldable spring means comprises a split-ring type of spring, and a groove in said wrench body for housing said split-ring type of spring in position.

17. A wrench for selectively turning either a first nut which is polygonal or a second nut which has a key-receiving configuration thereon comprising a wrench body having an open end, a bore in said wrench body, a member for turning said second nut, means mounting said member in keyed relationship with said wrench body and for axial sliding movement in said bore, spring mean sin said wrench body for biasing said member toward said open end, key means on said member for mating with said key-receiving configuration of said second nut for establishing a turning relationship therewith, bore means proximate said open end for receiving said first nut in turning relationship when said polygonal nut displaces said member into said wrench body against the bias of said spring means, and additional means for mounting said second nut on said wrench body.

18. A wrench as set forth in claim 17 wherein said additional means includes a plunger means having a first portion within said member and a second portion extending beyond said member for insertion into said second nut.

19. A wrench as set forth in claim 18 wherein said member means includes a counterbore in said wrench body for receiving said second nut.

20. A wrench as set forth in claim 18 including spring means for biasing said plunger means into said second nut and for permitting said plunger means to be retracted from said second nut as said second nut is forced onto an associated stud.

21. A wrench as set forth in claim 17 wherein said additional means for mounting said second nut comprises second bore means in said member for turning said second nut for receiving an end portion of said second nut.

22. A wrench for selectively turning either a first nut which is a polygonal or a second nut having an outer surface of revolution with a key-receiving opening in the end thereof comprising a wrench body having an open end, a polygonal bore in said wrench body, a polygonal member mounted in said polygonal bore for axial slidable movement therein, spring means in said bore for biasing said polygonal member toward said open end, key means on said polygonal member for mating with said key-receiving opening of said second nut, first abutment means proximate said open end for exerting an axial force on said second nut, said polygonal member being movable into said polygonal bore against the bias of said spring means to permit said first nut to enter said polygonal bore to establish a turning relationship therewith, second abutment means proximate said open end for exerting an axial force on said first nut in said polygonal bore, means on said wrench body for releasably retaining said first nut in said polygonal bore, said means on said wrench body for retaining said first nut comprising a yieldable spring, said first abutment means comprising a shoulder within a counterbore within said open end, said second abutment means comprising a second shoulder proximate said open end which is located radially outwardly of said shoulder within said counterbore.

23. A wrench as set forth in claim 22 wherein said yieldable spring comprises a split-ring type of spring, and a groove in said wrench body for housing said split-ring type of spring in position for yieldingly engaging the periphery of said first nut.

24. A wrench as set forth in claim 22 including retractible plunger means having a first portion located within said polygonal member and a second portion extending outwardly beyond said key means for entry into said second nut for supporting said second nut until said second nut threads onto an associated stud.

25. A wrench for selectively turning either a first nut which has a first configuration or a second nut which has a second configuration comprising a wrench body having an open end, a bore in said wrench body, a member for turning said second nut, means mounting said member in keyed relationship with said wrench body and for axial sliding movement in said bore, first spring means in said wrench body for biasing said member toward said open end, means on said member for mating with said second configuration of said second nut for establishing a turning relationship therewith, means proximate said open end for receiving said first nut in turning relationship when said first nut displaces said member into said wrench body against the bias of said first spring means, and second spring means on said wrench body for releasably retaining said first nut by said means proximate said open end against said bias of said first spring means.

26. A wrench as set forth in claim 25 wherein said second spring means comprises a split-ring type of spring, and a groove in said wrench body for housing said split-ring type of spring in position.

* * * * *

UNITED STATES PATENT AND TRADEMARK OFFICE
CERTIFICATE OF CORRECTION

PATENT NO. : 5,127,289

DATED : July 7, 1992

INVENTOR(S) : Thomas R. Lanham

It is certified that error appears in the above-identified patent and that said Letters Patent is hereby corrected as shown below:

Column 3, line 63, change "59" to --59'--.

Column 7, line 67 (claim 7), change "fist" to --first--.

Column 8, line 56 (claim 17), change "mean sin" to --means in--.

Column 8, line 67 (claim 18), delete "a" (first occurrence).

Signed and Sealed this

Twenty-first Day of June, 1994

*Attest:*

BRUCE LEHMAN

*Attesting Officer*   Commissioner of Patents and Trademarks